United States Patent
Glaser et al.

(10) Patent No.: US 9,448,822 B2
(45) Date of Patent: Sep. 20, 2016

(54) SYSTEM AND METHOD FOR MANAGING A VIRTUAL MACHINE ENVIRONMENT

(71) Applicant: International Business Machines Corporation, Armonk, NY (US)

(72) Inventors: Amir Glaser, Haifa (IL); Itai Blaiman, Haifa (IL); Sharon Chen, Haifa (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 368 days.

(21) Appl. No.: 13/735,058

(22) Filed: Jan. 7, 2013

(65) Prior Publication Data

US 2013/0212580 A1    Aug. 15, 2013

Related U.S. Application Data

(63) Continuation of application No. 12/673,507, filed as application No. PCT/IL2008/001115 on Aug. 13, 2008, now abandoned.

(30) Foreign Application Priority Data

Aug. 13, 2007 (IL) .......................... 185224

(51) Int. Cl.
G06F 9/455 (2006.01)

(52) U.S. Cl.
CPC ....... *G06F 9/45504* (2013.01); *G06F 9/45558* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 7,577,722 B1 | 8/2009 | Khandekar et al. | |
| 7,669,020 B1 * | 2/2010 | Shah et al. ................... | 711/162 |
| 8,141,075 B1 | 3/2012 | Chawla et al. | |
| 2005/0060704 A1 | 3/2005 | Bulson et al. | |
| 2007/0050765 A1 | 3/2007 | Geisinger | |
| 2007/0089111 A1 | 4/2007 | Robinson et al. | |
| 2007/0180448 A1 | 8/2007 | Low et al. | |
| 2007/0186212 A1 | 8/2007 | Mazzaferri et al. | |
| 2008/0072224 A1 | 3/2008 | Check et al. | |
| 2008/0196043 A1 * | 8/2008 | Feinleib et al. ............... | 719/319 |
| 2008/0301674 A1 | 12/2008 | Faus | |
| 2009/0070781 A1 * | 3/2009 | Fitzgerald ........... | G06F 3/04817 719/316 |
| 2009/0327211 A1 * | 12/2009 | McCune et al. ................. | 707/1 |

OTHER PUBLICATIONS

ISR for PCT/IL2008/001115 mailed Dec. 18, 2008.

* cited by examiner

*Primary Examiner* — Tammy Lee
(74) *Attorney, Agent, or Firm* — Cantor Colburn LLP; William A. Kinnaman, Jr.

(57) ABSTRACT

A system and method for providing an abstraction of the VM environment for management and control of one or more VMs without being tied to a particular hardware platform or construct.

16 Claims, 13 Drawing Sheets

Figure 7

Create new GLAN

General Information

Name: [      ]  Owner: [SYSTEM]

Type: [ODIO ▼]  NIC: [      ]

GLAN Type:
○ Temporary
⊙ Presisst
○ Permanent

Description
[                              ]

Network Information

Network: [      ]  Broadcast: [      ]

Netmask: [      ]  Default Gateway: [      ]

Routing Information

☐ Routed by: [    ▼]

[ Create ]
[ Close ]

Waiting for user input

Figure 11

| WAVESRV Time | User | System | Code | Type | Message |
|---|---|---|---|---|---|
| 2008-08-06 08:17:07.0 | sharon | WAVE | WAVGEN0041 | I | Administrator sharon logged in from SHARON-LAP1(192.168.0.1) |
| 2008-08-06 08:19:37.0 | sharon | CSLvm1 | WAVSYS21... | W | Failed to connect to API server on CSLvm1, attempting to reconnect (attempt number 1) |
| 2008-08-06 08:19:37.0 | sharon | CSLvm1 | WAVSYS0101 | I | Connection restored to the API server of CSLvm1 |
| 2008-08-06 08:21:08.0 | sharon | CSLvm1 | WAVSYS21... | W | Failed to connect to API server on CSLvm1, attempting to reconnect (attempt number 2) |
| 2008-08-06 08:21:08.0 | sharon | CSLvm1 | WAVSYS0101 | I | Connection restored to the API server of CSLvm1 |
| 2008-08-06 08:35:37.0 | sharon | CSLvm1 | WAVUSR0141 | I | zVM User LNRH400 Activated successfully |
| 2008-08-06 08:37:13.0 | sharon | WAVE | WAVWIN2... | W | Force DEQ was issued for CSLvm1.AMIR98-CLC_ENQ |
| 2008-08-06 08:37:16.0 | sharon | WAVE | WAVCLC0021 | I | WAVE CLC Client created for AMIR98 |
| 2008-08-06 10:27:57.0 | sharon | CSLvm1 | WAVSYS21... | W | Failed to connect to API server on CSLvm1, attempting to reconnect (attempt number 1) |
| 2008-08-06 10:27:58.0 | sharon | CSLvm1 | WAVSYS0101 | I | Connection restored to the API server of CSLvm1 |
| 2008-08-06 10:30:11.0 | sharon | CSLvm1 | WAVSYS21... | W | Failed to connect to API server on CSLvm1, attempting to reconnect (attempt number 2) |
| 2008-08-06 10:30:11.0 | sharon | CSLvm1 | WAVSYS0101 | I | Connection restored to the API server of CSLvm1 |
| 2008-08-06 10:32:27.0 | sharon | CSLvm1 | WAVSYS21... | W | Failed to connect to API server on CSLvm1, attempting to reconnect (attempt number 1) |
| 2008-08-06 10:32:27.0 | sharon | CSLvm1 | WAVSYS0101 | I | Connection restored to the API server of CSLvm1 |
| 2008-08-10 12:53:37.0 | sharon | WAVE | WAVGEN0041 | I | Administrator sharon logged in from SHARON-LAP1(192.168.0.1) |
| 2008-08-10 12:56:28.0 | sharon | CSLvm1 | WAVNET0221 | I | zVM user LNRH441 successfully disconnected from DEMO1 |
| 2008-08-10 15:10:46.0 | sharon | WAVE | WAVGEN0041 | I | Administrator sharon logged in from SHARON-LAP1(192.168.0.1) |
| 2008-08-10 15:24:22.0 | sharon | WAVE | WAVGEN0051 | I | Administrator sharon logged off from SHARON-LAP1(192.168.0.1) |
| 2008-08-13 08:27:45.0 | sharon | WAVE | WAVGEN0041 | I | Administrator sharon logged in from SHARON-LAP1(192.168.0.1) |
| 2008-08-13 08:42:48.0 | sharon | CSLvm1 | WAVUSR0101 | I | zVM User SHARON moved to Site defined group USER-LOCAL |

SYSTEM AND METHOD FOR MANAGING A VIRTUAL MACHINE ENVIRONMENT

FIELD OF THE INVENTION

The present invention relates to a system and a method for managing a virtual machine environment, and in particular, to such a system and method which provides an abstracted management interface.

BACKGROUND OF THE INVENTION

A "virtual machine" or VM is a processor which exists as a software construct, as opposed to a hardware processor. The VM also features memory and one or more I/O devices, as well as a control unit and one or more channels. Virtualization permits an operating system to be run by a non-native hardware system, as well as providing flexibility with regard to the number of entities operated by a single hardware platform. Multiple VMs may be operated by a single hardware computer, such as a mainframe for example. A VM may thereby provide flexibility in terms of providing multiple processors without requiring the purchase of specific numbers of hardware devices. Furthermore, VMs are useful for supporting operating systems such as LINUX on mainframe hardware, thereby permitting the same software operating systems and hence the same software packages to be operated across a plurality of different hardware platforms and configurations.

Currently VMs may be implemented according to one or more software support systems, such as the z/VM OS (operating system) running on the IBM System z for example. However, these software support systems do not provide a simple, intuitive interface and management control. Instead, specialized knowledge of the z/VM operating system and of the IBM System z hardware is required in order to operate the virtual machine solution, for example.

This situation may be contrasted with that of network management software for managing networks of hardware devices, which does provide a simple, intuitive GUI (graphical user interface) with much of the work automated. For example, software such as HP OpenView (Hewlett Packard) can automatically discover new network nodes, enable users to update permissions and/or tasks for various computers on the network and so forth. However, these software packages are only operable for networks of actual hardware devices connected in a network; they do not work for the virtual environment.

SUMMARY OF THE INVENTION

There is an unmet need for, and it would be highly useful to have, a system and a method for management of a VM (virtual machine) computing environment. There is also an unmet need for, and it would be highly useful to have, such a system and method which would support management without regard to the hardware platform or platforms on which the VM environment is operating. There is also an unmet need for, and it would be highly useful to have, such a system and method which would abstract the VM environment (hardware and software) through a simple, easy to use GUI (graphical user interface).

The present invention overcomes these drawbacks of the background art by providing an abstraction of the VM environment for management and control of one or more VMs without being tied to a particular hardware platform or construct. More preferably the abstraction enables an administrator to easily interact with the VM environment, without being required to be expert on the details of the operation of the VM environment. Preferably the abstraction is of both the hardware and software components of the VM environment. Optionally and preferably, the VM environment appears to the human administrator in a similar manner to a regular hardware environment. More preferably, a plurality of VM machines connected together form a VM machines network (commonly referred to as a Guest LAN in the z/VM) which may then be managed as for regular hardware networks.

According to preferred embodiments of the present invention, there is provided a user interface which features a GUI (graphical user interface). This permits the user to more easily manage, control and interact with VM machines, virtual networks and so forth (in fact the GUI optionally and preferably causes the VM environment to appear like the "real" open-systems hardware environment to the user).

According to other embodiments of the present invention, interactions of the user with the VM environment are recorded in a log, which more preferably records all events in the VM environment. The user preferably is required to log on with a unique user identifier, such as a user name and password for example. More preferably, one or more users may be granted different permissions, such that at least one user has greater permissions while at least one user has fewer permissions for operations in the VM environment. Hereinafter, the terms "admin" and "administrator" are preferably used interchangeably to refer to a user which has complete access to and control of the VM environment.

Hereinafter, the term "VM machine" refers to any software construct which is capable of running one or more software applications as though it was a single hardware computer. This term includes both full virtualization or emulation, such that the virtual machine simulates the complete hardware platform, allowing an unmodified operating system to be run regardless of the actual underlying hardware; and "para-virtualization" in which the software does not provide a full representation of the underlying hardware but instead provides an API (application programming interface) which does require modifications to the operating system to be operative.

Any two or more of such VM machines in communication with each other, optionally including any such VM machine in communication with a separate computer, may optionally comprise a "virtual network", also referred to herein as a "VM virtual network" or "Guest LAN".

It should be noted that when implemented according to the z/VM operating system for IBM System z hardware, cross-LPAR communication within the same CPC (Central Processing Complex—the System z server) may optionally be performed directly through memory, at the hardware level, through a construct known as hypersockets, which are optionally included in the above definition of VM machines network.

Unless otherwise defined, all technical and scientific terms used herein have the same meaning as commonly understood by one of ordinary skill in the art to which this invention belongs. The materials, methods, and examples provided herein are illustrative only and not intended to be limiting. Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 4-13 show exemplary, illustrative screenshots of an exemplary GUI (graphical user interface) for implementing user interface 126 according to some embodiments of the present invention.

DESCRIPTION OF THE PREFERRED EMBODIMENTS

Figure 1:
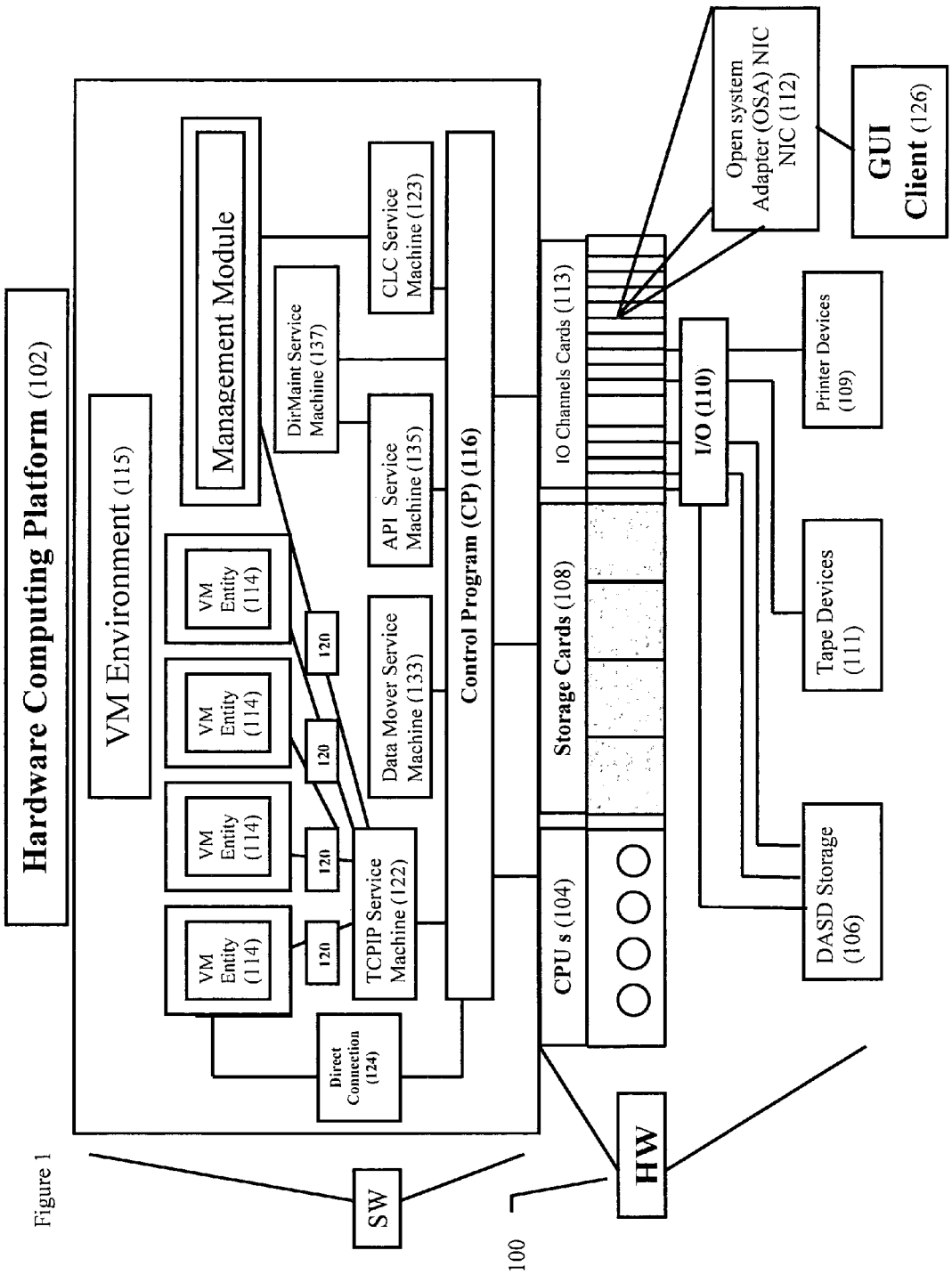
FIG. 1 is a schematic block diagram of an exemplary, illustrative system according to some embodiments of the present invention.

The present invention is of a system and a method for providing an abstraction of the VM environment for management and control of one or more VMs without being tied to a particular hardware platform or construct.

It should be noted that the description below centers around the IBM System z architecture, and in particular to the management of one or more Linux virtual servers in the z/VM environment. However this description is provided for the purpose of clarity only and is not meant to be limiting in any way, as the present invention is applicable to any virtual machine environment. The z/VM environment is intended only as a non-limiting example of a virtual machine monitor or hypervisor (software which provides or hosts the virtual environment).

Optionally and preferably, the VM environment appears to the human administrator in a similar manner to a regular hardware environment through preferred embodiments of the system and method of the present invention. For example, the human user is preferably able to communicate with the VM machine through the system and method of the present invention, including performing management tasks as described in greater detail below. More preferably, a plurality of VM machines connected together form a VM machines network which may then be managed as for regular hardware networks.

According to preferred embodiments of the present invention, there is provided a user interface which features a GUI (graphical user interface). This permits the user to more easily manage, control and interact with VM machines, virtual networks and so forth (in fact the GUI optionally and preferably causes the VM environment to appear like the "real" open-systems hardware environment to the user).

According to some embodiments of the present invention, there is provided a system and method for management of one or more VM machines which is provided through abstraction of the VM environment. Such management optionally and preferably includes at least basic management of the VM machine in the VM environment, including but not limited to, the ability to activate or deactivate the VM machine or machines, to show its status and so forth. More preferably, more complicated management tasks are also supported, such as managing (ie changing, deleting or adding) one or more attributes for a VM machine, such as memory and/or storage space (such as storage disks) allocated, password management and the like.

The user is also preferably able to view who is using each CSL-WAVE entity. Such an entity is a construct provided according to some embodiments of the present invention for controlling access to at least some aspects of the VM operating system. More preferably, such a construct is provided for at least those aspects, parameters or resources of the VM operating system which can only be provided for serial access, such that parallel access by a plurality of users could potentially cause damage to such aspects, parameters or resource, for example by corrupting a file or database. The entity features an implementation of Wave Resource Serialization mechanism, termed herein WRS.

Other information which is optionally and preferably provided includes the number of available disk slices (an example of virtual storage devices) are on each VM machine, as well as how much storage is being used, pages in virtual memory, storage type, CPU use and so forth. Preferably, for each type of information that is provided, a corresponding management action is also support (for example being able to add/remove disk slices, reduce/increase CPU use and so forth). It should be noted that the term "disk slice" refers to a type of hard disk storage available on mainframes, as a partition portion of a single hard disk volume or any portion of the disk that can be attributed to a specific user through the specific VM operating system. Any type of hard disk storage could optionally be substituted for the disk slice.

With regard to the Linux virtual server in the z/VM environment, such management commands may optionally and preferably include z/VM commands including but not limited to Activate, Deactivate and Show status, or provide a virtual network hardware definition, for a specific VM machine or alternatively for a group of VM machines (see below for more information). These commands may optionally and preferably be provided by the user through the interface according to the present invention, such as a GUI for example, without the user being required to know the underlying z/VM commands. Instead, the user may optionally and preferably issue the commands through selection from a menu, "drop down" box or any other simple interface choice selector.

Furthermore, the user is optionally and preferably able to modify such commands, for example to require a rapid or forced shutdown of a VM machine, or alternatively to require a more graceful shutdown in which various processes are first stopped, before the VM machine is shut down.

Optionally and more preferably, the system according to the present invention is capable of performing a discovery process, most preferably an automatic discovery process, for example for a new VM machine, in order to determine the type of installation of the operating system and its effect on the type of shutdown procedure(s) which may be performed. For example, in the case of the LINUX operating system for a LINUX server, the discovery process preferably includes determining whether the server installation process was defined properly (for example whether the zIPL control block was properly generated during installation). The shutdown process is preferably adjusted according to whether the server installation was performed properly, such that the system then preferably may shut down the server accordingly with user notification, preferably as gracefully as possible.

Discovery may optionally be an on-going process (ie it may optionally be performed more than once) and may also optionally be used to identify the operating system of each new discovered VM machine.

According to preferred embodiments of the present invention, the system and method communicate with each VM machine through Communication-Less Connection referred to in the invention as "CLC" which permits communication even without a TCP/IP connection to the VM machine. Currently (as is known in the art), a virtual TCP/IP connection may be required for a VM machine, regardless of the underlying software system (or hypervisor) providing the VM machine. Some embodiments of the present invention provide a potential by-pass for such a virtual connection and instead preferably provides a permanent connection to the VM machine, regardless of its status. These embodiments are important because if the VM machine TCP/IP connection(s) were to "crash" or cease operating and/or otherwise have difficulties in operating, the user would still be able to issue one or more commands to the VM machine through CLC, which could for example optionally permit the user to "reboot" (restart) the VM machine.

Preferably the user can issue commands and obtain output from any VM machine, more preferably through the user interface, even if the VM machine has no operative TCP/IP connection, through communication-less connection according to some embodiments of the present invention.

Also optionally and preferably, the user can directly edit one or more files on a VM machine, again more preferably through the user interface, even if the VM machine has no operative TCP/IP connection, again through communication-less connection edit feature.

As a non-limiting example of communication-less connection, if the VM machine was a virtual Linux server, the Linux "ifconfig" command could be used without an actual TCP/IP connection. Instead, preferably a separate console window is opened which operates the Linux commands, such as ifconfig. As another example, the command "ifconfig [network device] down" can be used to deactivate the TCP/IP communication of the VM machine through the virtual connection, while the command "ifconfig [network device] up" could be used to activate it, again even without a direct TCP/IP connection. Preferably, if the command would cause damage and/or a potential difficulty, then a warning is issued. For example if the last virtual Ethernet card in a VM machine is brought down, then any user connected to the virtual machine guest OS will be disconnected, so a warning is preferably issued. Of course, any other Linux commands (including the full-screen command "top") could be used, including operational interrupts (through a dedicated break button which is analogous to CTRL-C) for example.

Optionally and preferably, connection-less-communication (CLC) comprises a socket interface and a "listener" which receives commands to/from VM machines, and is therefore able to provide communication even if the VM machine doesn't have a direct TCP/IP connection. Preferably the VM environment (host software) has an active TCP/IP connection. The socket interface is preferably operated by a special or dedicated VM machine.

Also optionally and preferably, the system and method supports editing of files on a VM machine even without a direct TCP/IP connection to that VM machine.

Alternatively or additionally, the system and method of the present invention preferably supports SSH (secure shell) for communication and interactions with the LINUX guest (server) in an industry standard secure manner.

Alternatively or additionally, the system and method of the present invention preferably supports 3270 (terminal protocol) for communication and interactions with the LINUX guest (server) in a System z standard terminal communication.

According to other embodiments of the present invention, interactions of the user with the VM environment are recorded in a log, which more preferably records all events in the VM environment and most preferably also with the system of the present invention. An administrator can then optionally open and view the log of a plurality of users, more preferably with filtering on the log by user, type of message (for example for warning messages), time of day and so forth.

The user preferably is required to log on with a unique user identifier, such as a user name and password for example. More preferably, one or more users may be granted different permissions, such that at least one user has greater permissions while at least one user has fewer permissions for operations in the VM environment. For example, for security purposes, administrative users may optionally add new users and update the permission(s) available to each such user, preferably through a simple GUI (graphical user interface). Optionally and preferably, one or templates are available to set basic permissions (for example, regular user, network administrator, system administrator and so forth).

In addition, each user may optionally be assigned multiple scopes. Scopes define the z/VM Objects a user can view and interact with. Each scope contains a permission entry which describes the actions the user can perform on all the objects in that scope. Each scope is defined for one type of object—Guest LANs (GLAN), Projects or DASD Groups. Various menu choices preferably contain all z/VM Objects from the selected z/VM System that are in the current user's scope. Once an object is selected, preferably a plurality of actions that can be taken against these objects become selectable.

According to other embodiments of the present invention, the system and method provides a VM machine cloning facility which permits a new VM machine to be created according to a template. Such a template may optionally be determined according to an existing VM machine, such that the VM machine is literally "cloned". Additionally or alternatively, such a template may optionally be determined separately according to a plurality of parameters to define a prototype. Regardless, such a cloning facility optionally and preferably supports rapid provisioning of resources for workload distribution over multiple virtual servers, for example.

Optionally and more preferably, the cloning process of a z/VM guest from a prototype is a two phase process. In phase 1, the system of the present invention preferably performs various actions which are synchronous in nature. In phase 2, the system preferably uses API calls to clone the disks of the prototype. More preferably, the actions of phases 1 and 2 are performed by the clone dialog of CSL-WAVE and then by a scheduled work unit as described in greater detail below. This action might result in the creation of DIRMAINT Work Units and pseudo-work units. These work units are aggregated in a single CSL-WAVE Work Unit per virtual server clone. That is, if 10 virtual servers are cloned, 10 CSL-WAVE Work Units are generated. These work units are synchronous in nature and will be executed by the DATAMOVE service machines of Dirmaint on the z/VM System. The invention's Work Unit Monitor background service will monitor these work units and update their status. The Workunit Monitor service is a monitoring service, according to some embodiments of the present invention, that preferably runs constantly on the server that hosts the CSL-WAVE database. These services preferably constantly monitor several aspects of the z/VM instances, their resources and the virtual guests that run within these z/VMs.

The clone dialog mentioned above also preferably includes automatically suggesting an IP address as well as the automatic or manually selectable connection to a particular Guest LAN(s). Optionally, a plurality of such cloned servers may be created simultaneously.

According to still other embodiments of the present invention, the system and method support creation of a new network point on a VM Guest LAN. Optionally and preferably, the user may construct and/or alter VM Guest LAN(s) through the user interface. For example, the user may more preferably connect/disconnect VM machines such as virtual servers to the Guest LAN permanently or temporarily. Most preferably, such connection and/or disconnection is supported through a GUI operation, for example by drawing a line to connect a VM machine or deleting a line to disconnect a VM machine to a Guest LAN. While connecting or disconnecting from a Guest LAN, there is no connectivity to the virtual server; therefore, preferably CSL-WAVE uses the CLC API to make the necessary modification(s) to the virtual server.

According to other embodiments of the present invention, a new Guest LAN may be automatically discovered by the system and method of the present invention, through an auto-discovery mechanism employed by the Batch Service (one of the background services). Preferably the mechanism also fills the database with metadata automatically. The metadata may also optionally include information about each connection (IP address, permanent/temporary, who created it) and so forth. The auto-discovery, or auto-detect mechanism, preferably first attempts to connect to the new VM system through the API server. If the connection is made, then the user is preferably prompted for information, such as for example the virtual address of the disk addressed by DIRMAINT (for z/VM systems; this is an application for user directory management, as described in greater detail below), the name of the DASD Group or Volume on which the WAVECLC Service Machine will be store its code (described in greater detail below), the name of the TCP/IP virtual server (for z/VM systems) and the virtual address on which the TCPIP profile resides. Furthermore, preferably the system of the present invention, for z/VM systems, auto-detects all the z/VM Users on the new z/VM System and it classifies them into default Site Defined Groups. z/VM Users that CSL-WAVE finds on the z/VM System that are not included in the default z/VM User list are classified as "USERLOCAL". Preferably, the CSL-WAVE User is then prompted or allowed to assign an OS to those z/VM Users. The default OS is "UNASSIGNED".

Next, the user is preferably able to create links from DIRMAINT to TCPIP and WAVECLC, optionally by manually editing the DVHPROFA DIRMAINT file although alternatively such links may be created automatically. For example, for manual editing, the following lines may optionally be added: PURPOSE=WVA FM=P ACC=399 A link to WAVECLC disk for REXX; and PURPOSE=WVB FM=Q ACC=592 A link to the TCPIP 592 disk for IFCONFIG processing.

Optionally and preferably, the user may group a plurality of VM machines according to a user defined or selected attribute. Such a group is then preferably shown to the user upon selecting a view of the VM machines by characteristics (ie by groups). The user may optionally add a VM machine to a particular group by dragging and dropping the VM machine to the group on the GUI. The user may optionally perform one or more management operations on the group through a single action execution, for example by activating/deactivating such a group as a group, rather than by requiring the user to perform the activating/deactivating action on each member of the group singly. One or more messages may optionally be sent to a group for example. Such a group action is more preferably performed through a single GUI interaction, such as a single "mouse click" (or other single action by a pointing device).

Attribute changes are preferably performable on a group of VM machines, for example by permitting the user to alter one or more attributes for the group, such as memory and/or storage space (such as storage disks) allocated, password management and the like.

The groups of VM machines are optionally and preferably determined according to one or more metatags, which are preferably not related to network location. The metatags preferably determine one or more shared group properties, for example according to the resources permitted to the group, actions to be taken on the group and so forth. The user is preferably also able to perform one or more specific actions on a subgroup without needing to construct an entire new group; instead the subgroup is preferably defined temporarily for one or more actions.

The user may also optionally request a report separately from each VM machine in a group or subgroup. For example, if the user chooses to activate a plurality of VM machines in a group or subgroup, the user is preferably able to request a verified status for each VM machine to be reported separately.

According to yet other embodiments of the present invention, the system and method may optionally and preferably be operated on a hardware platform, such as a mainframe, as part of the VM environment and/or alternatively on a separate physical server outside the realm of the VM environment.

According to still other embodiments of the present invention, a database of information about the VM environment is preferably maintained so that a GUI can be rapidly constructed (optionally and preferably with a timestamp to show the last time that it was updated). This database implementation enables the user to rapidly view a constructed GUI and/or to rapidly change GUI views. If the user wishes to a view the most up-to-date information about the VM environment, the user may optionally and preferably select an update function to obtain information about the VM environment in real time.

According to other embodiments of the present invention, a plurality of VM environments may optionally be operated by a single hardware machine, such as a mainframe computer for example, which are then preferably displayable to the user through the GUI. By "displayable" it is meant that the GUI may provide at least one view in which the plurality of VM environments and their status is shown. Preferably, such a view would indicate whether the VM environment is registered through the system of the present invention.

Also preferably, the user would be able to select each VM environment separately for viewing status information. Upon such selection, preferably information about the VM environment would be shown through the GUI, including but not limited to information about all CMS users, networks, prototypes to clone, the possibility to refresh (to obtain real time information about the VM environment), reconnecting to the VM environment if the connection is lost and the like.

Optionally and preferably, the user may view and/or manage and/or interact with and/or control more than one CPC through the GUI, more preferably including the ability to perform "zooming in", for example to view each CPC separately and also preferably including the ability to perform "zooming out", for example to view all CPCs and/or a plurality of CPCs at one time.

According to other preferred embodiments BMI (bare metal installation) is supported, for example to install a new version of an operating system such as Linux on the VM machines. Such installation may optionally be performed as follows. The user preferably loads the new installation onto the system of the present invention. The installation may optionally be provided on any suitable type of media and in any suitable format, such as an ISO image (or any other format). The system of the present invention then preferably automates the process of creating a new VM user, and then issuing one or more commands for an automatic install onto the new VM user, more preferably through a template or alternatively and more preferably through parameters provided by a human administrator. The automatic installation may optionally be performed according to a script and/or template provided by the operating system itself for installation.

According to still other preferred embodiments of the present invention, there is provided a user interface which features a three dimensional GUI. This interface may for example optionally be provided through virtual reality or any other three dimensional display method, as described for example in U.S. Pat. No. 5,347,400, hereby incorporated by reference as if fully set forth herein. U.S. Pat. No. 5,958,012 describes a system for providing a virtual reality system for network management of hardware networks and is also hereby incorporated by reference as if fully set forth herein. The interface preferably enables the user to view the VM machine network and/or plurality of networks according to any desired model, including but not limited to viewing virtual server farms and/or a virtual data center, more preferably with all cross-references of networks.

A brief description of the IBM virtual machine environment for the mainframe hardware System z (referred by IBM as "z/VM") and the operation of Linux in the z/VM is now provided for the purpose of clarity only and without intending to be limiting in any way (this information was taken from "Getting Started with Linux on System z", version 5, release 3).

The z/VM environment allows each user to have a complete, virtual mainframe computer (VM machine), by virtualizing the actual mainframe computing resources. Since the z/VM environment provides complete virtualization, each VM machine runs its own operating system and manages its virtual resources. Furthermore it is possible to interact with each VM machine as though it was actual hardware: the operating system can be booted, disks or other peripherals can be added and removed, and so forth. Each VM machine is associated with a z/VM user identifier or logon identifier, for identifying the human user (and hence controller) of the VM machine.

The Control Program (CP) is the component of z/VM that manages the resources of a single hardware computer for providing a plurality of VM machines. CP is the equivalent hypervisor program for the z/VM environment, which is the supporting layer between the hardware of the computer and the VM machines themselves. The CP provides CPU (central processing unit) functions, input and output devices, and storage, including the ability to interact with "real" hardware peripherals and so forth. CP also enables each VM machine to run its own operating system, such as Linux (as for this example, although of course other operating systems could be used instead).

The CP may be used to dedicate one or more actual hardware resources to a particular VM machine, such as a network interface. On the other hand, hardware resources such as CPU(s) may be shared, such that each VM machine has at least one virtual CPU. Another example of a typically shared hardware resource is storage. Still other resources are completely simulated as for example a virtual switch, which is a simulated LAN networking switch.

As a specific example of hardware storage support by the CP, the CP provides the previously described "disk slices". CP can logically partition real DASD volumes into disk slices (the IBM terminology uses the word "mini disk"), such that each VM machine perceives the disk slice as a complete DASD volume, each starting at cylinder 0 and so forth. This reduces the management tasks for the VM machine. The CP reorients the channel programs by modifying the cylinder offsets in the channel program to address DASD cylinders owned by the VM machine. The CP also supports temporary disk slices, which last only as long as the VM machine is logged on; they are deleted upon log-off.

In some situations, virtual disks are provided for storage rather than disk slices. The virtual disks do not have any direct one-to-one relationship to a specific hardware disk and instead are formed from available storage. Again they are supported by the CP which handles the interactions with the actual underlying hardware.

Interactions between human users and z/VM are provided through the Conversational Monitor System (CMS). CMS is a single-user operating system that runs in a VM machine (VM user), but is also used to manage z/VM itself and also VM machines being operated through the z/VM environment. CMS also supports system utilities and tasks, such as TCP/IP and system management functions.

CMS also supports an automated application for assisting users to manage the z/VM environment, known as the Directory Maintenance Facility (DirMaint), which is an example of a commercially available product for VM management. DirMaint provides a simplified command interface and automated facilities for managing the VM machines and the users of such entities (ie the user directory).

For more rapid operation of the z/VM, the CP can allow all VM machines to access certain parts of real hardware storage in the same manner when required, which are termed "shared segments". For example, the CMS nucleus is shared in real storage by all VM machines.

As previously noted, among the drawbacks of CP and CMS are that they do not provide an intuitive user interface. Instead, the human user must learn a new set of commands and also a new command structure and interface. As described herein, including in an illustrative, exemplary manner with regard to the drawings below, the present invention overcomes this drawback by providing an additional interface layer.

Another product which provides a similar function to DirMaint includes VMSecure of CA (Computer Associates, USA). Of course any other product having at least similar functionality could also optionally be substituted for interaction with the system of the present invention as described herein.

The principles and operation of the present invention may be better understood with reference to the drawings and the accompanying description.

Referring now to the drawings, FIG. 1 is a schematic block diagram of an exemplary, illustrative system according to some embodiments of the present invention. It should be noted that the system is shown in a highly schematic manner as a logic diagram.

As shown, a system 100 features a hardware computing platform 102. Hardware computing platform 102 may optionally be implemented as any type of computer, but for the purpose of description herein and without intending to be limiting in any way, is described with regard to a mainframe computer (such as those available from IBM for example with regard to System z). Hardware computing platform 102 features at least one CPU 104, of which a plurality are shown for the sake of illustration only and without intending to be limiting in any way. Hardware computing platform 102 also preferably features a DASD storage 106, a memory (shown as storage cards as an example only) 108, an I/O device 110 and a network interface 112 for connecting to a network (not shown; shown as an open system adaptor (OSA) NIC as an example only). Hardware computing platform 102 also preferably features one or more tape devices 111 and one or more printers 109. These components are shown as communicating through a plurality of channels 113.

Hardware computing platform 102 operates a plurality of VM machines 114 as shown (of which three are shown for the purpose of example only and without intending to be limiting in any way). VM machines 114 are part of a VM environment 115 and are supported by a CP (control program) 116, which is provided as a non-limiting example of a hypervisor; for the purpose of description only and without intending to be limiting in any way, the activities of the hypervisor (CP 116) are described with regard to the z/VM environment of IBM. CP 116 supports all interactions of VM machines 114 with hardware computing platform 102 as shown (and as previously described). Again for the purpose of description only and without intending to be limiting in any way, each VM machine 114 is described herein as running the operating system Linux (although of course other operating systems could be used in its place).

CP 116 interacts with a management module 118 according to some embodiments of the present invention. Management module 118 preferably supports communicationless connection with VM machines 114. As shown, each VM machine 114 preferably features a VM TCP/IP connection 120 to a TCP/IP service machine 122 of VM environment 115. As is currently known in the art, should VM TCP/IP connection 120 be lost (for example if VM machine 114 were to "crash" or cease correct operations), CP 116 could not communicate with VM machine 114. Management module 118 preferably provides a direct connection 124 which by-passes VM TCP/IP connection 120, as described in greater detail with regard to FIG. 2 below.

Direct connection 124 is shown as supporting a CLC service machine 123 for supporting communication less connection as described in greater detail below. In fact any type of communication may optionally be supported, regardless of whether management module 118 is operated by a different computer than hardware computing platform 102 or by hardware computing platform 102 itself.

Management module 118 optionally and preferably provides a user interface 126 for enabling a human user to interact with each VM machine 114 as though VM machine 114 was an actual hardware device. As described with regard to FIGS. 4-6 below, user interface 126 is preferably a GUI (graphical user interface) which is more preferably implemented in a similar manner as for network management software for actual computer hardware networks.

User interface 126 is preferably used to perform a plurality and more preferably all management tasks, including but not limited to activating and deactivating one or more VM machines 114, viewing their status, viewing resources being used, assigning one or more such resources and so forth. A description of these management tasks is provided in greater detail with regard to FIGS. 4-6 below.

A data mover service machine 133 is used under z/VM for moving data to/from DASD storage 106 and an API service machine 135 is used to communicate with DIRMAINT (application for user management, as described in greater detail below) through a directory maintenance service machine 137 (CP 116 may also optionally communicate directly to directory maintenance service machine 137).

Figure 2:
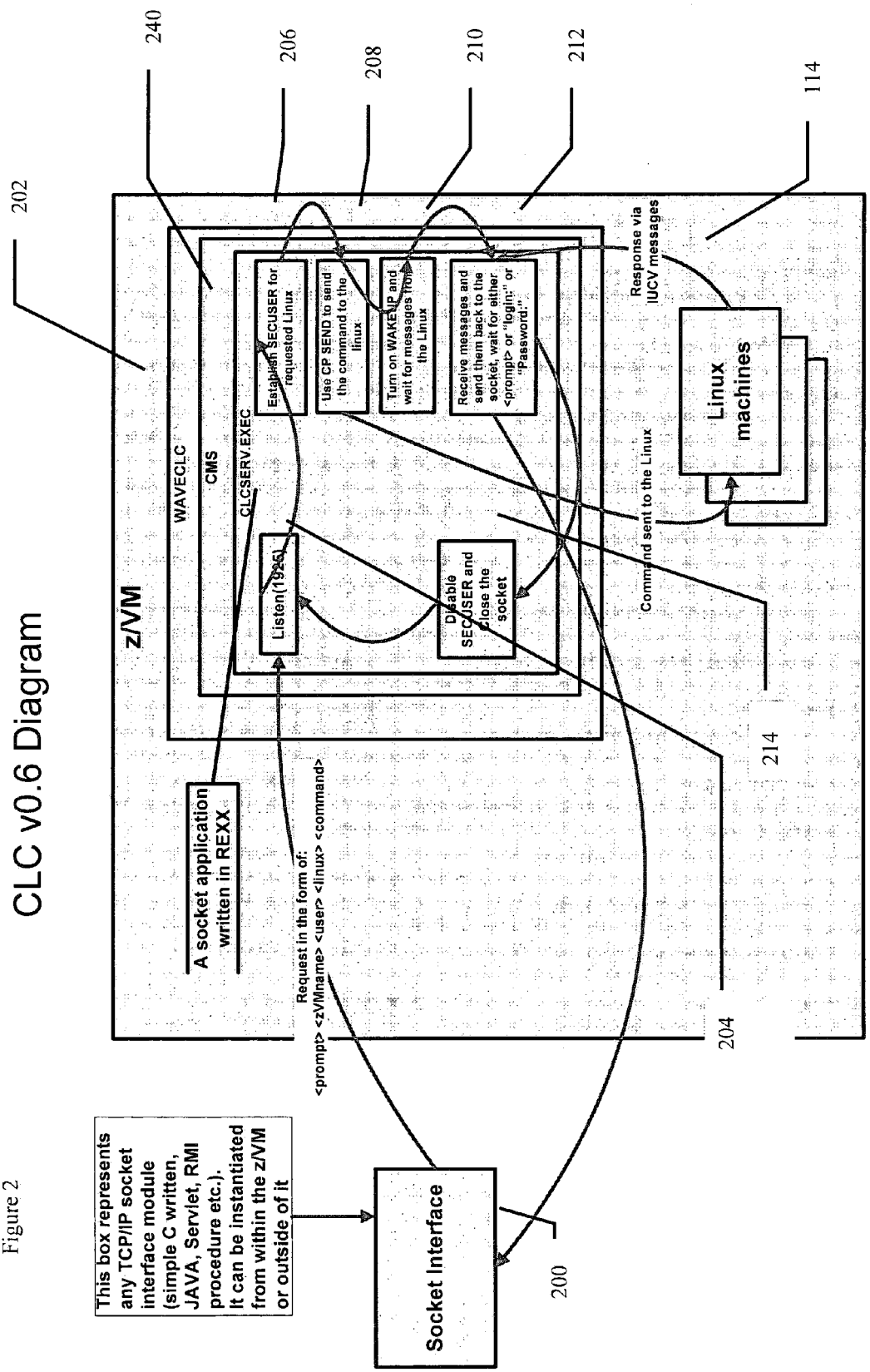
FIG. 2 is a schematic block diagram of an exemplary direct connection 124 from FIG. 1 in more detail.

FIG. 2 is a schematic block diagram of an exemplary direct connection 124 from FIG. 1 in more detail. As shown, direct connection 124 preferably features a socket interface 200, which may optionally be any type of socket interface as is known in the art. Socket interface 200 sends a request to a VM machine 114, which is preferably intercepted by a WAVECLC 202. WAVECLC 202 is optionally and preferably operated in the VM environment through CP 116.

WAVECLC 202 preferably features a listener 204, which may for example operate by listening on port 1925 (although other ports may be used instead). Listener 204 intercepts the request from socket interface 200 and sends it to a SECUSER module 206, which uses the z/VM command to establish WAVECLC 202 as a secondary console, so that all messages to/from the particular VM machine 114 are passed through WAVECLC 202. In other words, WAVECLC 202 is preferably acting as a VM user in the z/VM system.

SECUSER module 206 then uses the CP SEND command of z/VM to send this command to the particular VM machine 114, as shown with regard to reference number 208. Next, a wakeup module 210 is started to listen for messages from the particular VM machine 114.

Wakeup module 210 intercepts messages from the particular VM machine 114 and then sends them back to socket interface 200, as shown with regard to reference number 212. Upon completion of the socket-based operations, SECUSER is disabled and the socket is closed, as shown with regard to reference number 214. At this point, listener 204 again listens for a new socket request.

It should be noted that throughout this operation, socket interface 200 does not need to be aware of the existence of WAVECLC 202 or of any of its components, nor does socket interface 200 need to be adapted in any way. Instead, socket interface 200 needs to be compatible with z/VM environment and operational commands. Furthermore, the operations of WAVECLC 202 completely bypass the VM TCP/IP connection of VM machine 114.

The operative components of WAVECLC 202 which provide the listening services may optionally be implemented as a socket written in any suitable language, including but not limited to C, JAVA and/or REXX, thereby forming a CLCserv.exec 240 as shown.

Figure 3:
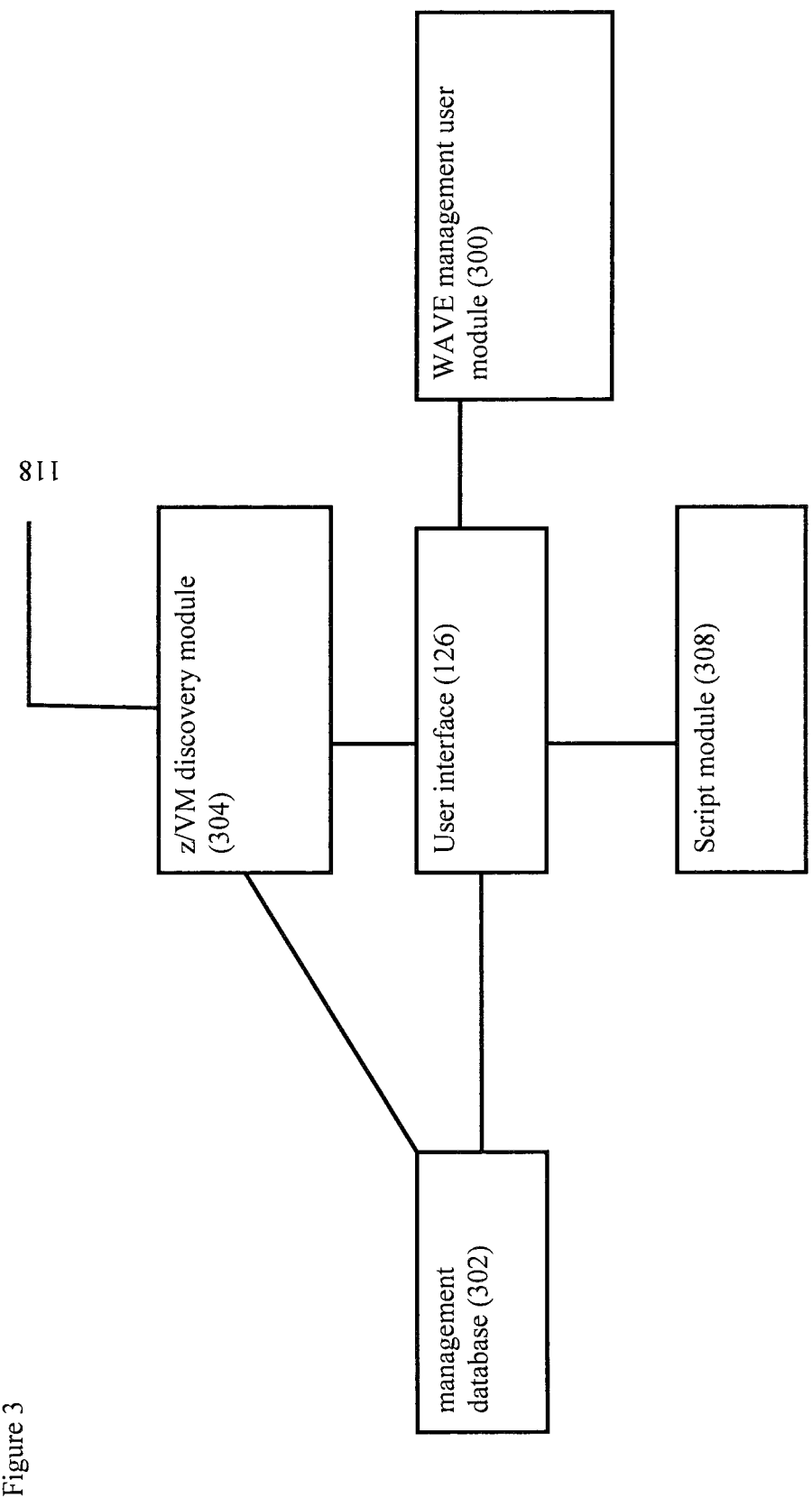
FIG. 3 shows a schematic block diagram of an exemplary management module 118 from FIG. 1 in more detail.

FIG. 3 shows a schematic block diagram of an exemplary management module 118 from FIG. 1 in more detail. As previously described, management module 118 includes a number of functions for interacting with the z/VM environment, optionally including a number of functions which are performed through the CP (hypervisor) of FIG. 1 (not shown). Management module 118 also interacts with user interface 126 (also included in FIG. 3) and hence provides a number of user support functions. Both aspects of the functionality of management module 118 are illustrated in FIG. 3.

As shown, management module 118 preferably features a management user module 300, for providing control over the functions of management module 118. Management user module 300 preferably stores data in a management database 302, which optionally and preferably includes such information as a list of users for management module 118, the permissions provided to each such user, metadata about the VM machines in the z/VM environment, a log of each user's actions in the z/VM environment, a list of all resources used by each user in the z/VM environment and so forth. Users preferably interact with management module 118 through user interface 126 as shown, which in turn sends such interactions to management user module 300 and then receives information in return from management user module 300.

WAVE management user module 300 preferably interacts with a z/VM discovery module 304, which directly interfaces with the DIRMAINT API (not shown). DirMaint is given as a non-limiting example of a user management tool as previously described. This interface is preferably used to facilitate and enable, management of VM users and defined virtual devices, including VM machines, as well as other components in the virtual environment. It is also preferably used to discover events and/or components in the virtual environment, and is also preferably used to execute commands.

The direct connection from FIG. 2 (not shown) preferably resides at z/VM discovery module 304. z/VM discovery module 304 also preferably interacts with management database 302, for storing information related to the VM machines in the z/VM environment (not shown), which may optionally be constructed with a plurality of different tables and/or other separation. Preferably, such information is used to more quickly render a graphical illustration of the z/VM environment, as described in greater detail below. The information stored preferably includes a list of VM machines and their attributes, and a description of any metadata groups to which they belong. The information preferably also relates to z/VM users and their permissions (as granted in the z/VM environment, as opposed to those permissions granted for management user module 300; the two need not be completely overlapping or identical).

Management database 302 preferably also stores such information as a list of Guest LANs or local area networks in the z/VM environment, their attributes and their connections (ie to which virtual switches and VM machines they are connected). In addition, preferably information related to prototypes (cloning templates) and the like is also stored.

As an illustrative method for operation of management module 118 (from the perspective of the user), a user would preferably log-on through user interface 126, more preferably by providing a user name and password. Management user module 300 preferably determines whether the user is present in management database 302 and according to information stored therein, determines which permission(s) are to be granted to the user. In addition, the log-in time and location of the user is preferably noted in management database 302; subsequent actions of the user during the session are preferably also stored in management database 302.

The user may request a graphical view of the z/VM environment, optionally including a plurality of VM machines networks. For faster rendering, such data may be provided from management database 302. However, the user may also optionally request a "real time" or updated view, in which case user interface 126 preferably sends such a request to z/VM discovery module 304, which in turn submits the request for updated information to the hypervisor (in this example and for illustrative purposes only, the CP) through known mechanisms in the CP interface. The CP then sends the updated information to z/VM discovery module 304, which provides the information to user interface 126. The updated information is then used to update the graphical display on user interface 126.

The user may also optionally choose to issue one or more commands through user interface 126, for example to view the status of a VM machine, to change one or more aspects of the function of the VM machine and/or to alter a VM machines network. If the user has the requisite permission(s) to perform the requested action(s) according to information stored in management database 302, then the command(s) are passed to z/VM discovery module 304, which in turn submits the command(s) to the CP. Any information or status update(s) provided by the CP are given to z/VM discovery module 304, which then provides them to user interface 126. Management database 302 is preferably updated and the information is preferably displayed to the user through user interface 126.

z/VM discovery module 304 preferably also provides the ability to filter the display through user interface 126 by Site-Groups, User-Groups, Project Association, Linux Deployment, Guest-LANs, Server Name Mask and status (Active/Inactive) or any mixture of the above. In addition, z/VM discovery module 304 preferably also supports the ability to graphically manage the Guest-LANs and also optionally and more preferably the ability to graphically manage disk storage quotas, while confirming to the scope and permissions policies.

Script module 308 may also optionally and preferably be used to store one or more custom scripts for example for issuing one or more commands as described above. Preferably these scripts permit customization and automation. One or more scripts may optionally and preferably be run automatically in some circumstances (for example when adding a new user, can run a registry script, or when a user changes password, preferably to automatically change the data in management database 302 as well for example).

Script module 308 is preferably divided into three functions: Scripts Repository Manager, Script Editor and Script Executor. The Script Repository Manager provides the user with the ability to manage scripts by categories, with the option to assign a script a private or global attribute. Depending upon permissions granted, scripts may optionally be shared across users of the CSL-WAVE system. Each script is managed with the additional attributes of CSL- WAVE user as the Owner who has created the script, Date-Time stamp of when the script was created and the same information of the last user who has modified the script. The user of the Scripts Repository can view the directory of the repository by a specific category, or all categories, in either case with additional filters of Private and Global attributes.

The Script Editor facilitates creation and update of script lines, as well as the script description and Private/Global attributes. The Script Executor allows the user to select the script from the Scripts Repository to run against any virtual server or group of virtual servers. The Executor operates in multiple threads when the user selects multiple virtual servers as the target of the run. The user has the option to move the Executor task to the background Session Tasks, where the Executor continues to monitor the execution of the script. The user may expand the Executor window at any time to check the progress of the script task for each virtual server, and then send it back to the background and continue with other CSL-WAVE activities.

Once all of the servers have reported of the completion of the script execution to the executor, it alerts the user with a popup message that the script execution has completed. The user can view the results of the run for each virtual server in a multi-tab window (a tab for each server).

Scripts in the repository can optionally call other scripts in the repository regardless of the virtual server on which they are running. The repository is dynamically mounted on each virtual server and un-mount at the end of the script execution. Optionally, multiple users are permitted to run multiple scripts concurrently on the same virtual server as each user preferably receives a different mount point dynamically.

FIGS. 4-9 show exemplary, illustrative screenshots of an exemplary GUI (graphical user interface) for implementing user interface 126 according to some embodiments of the present invention.

Figure 4:
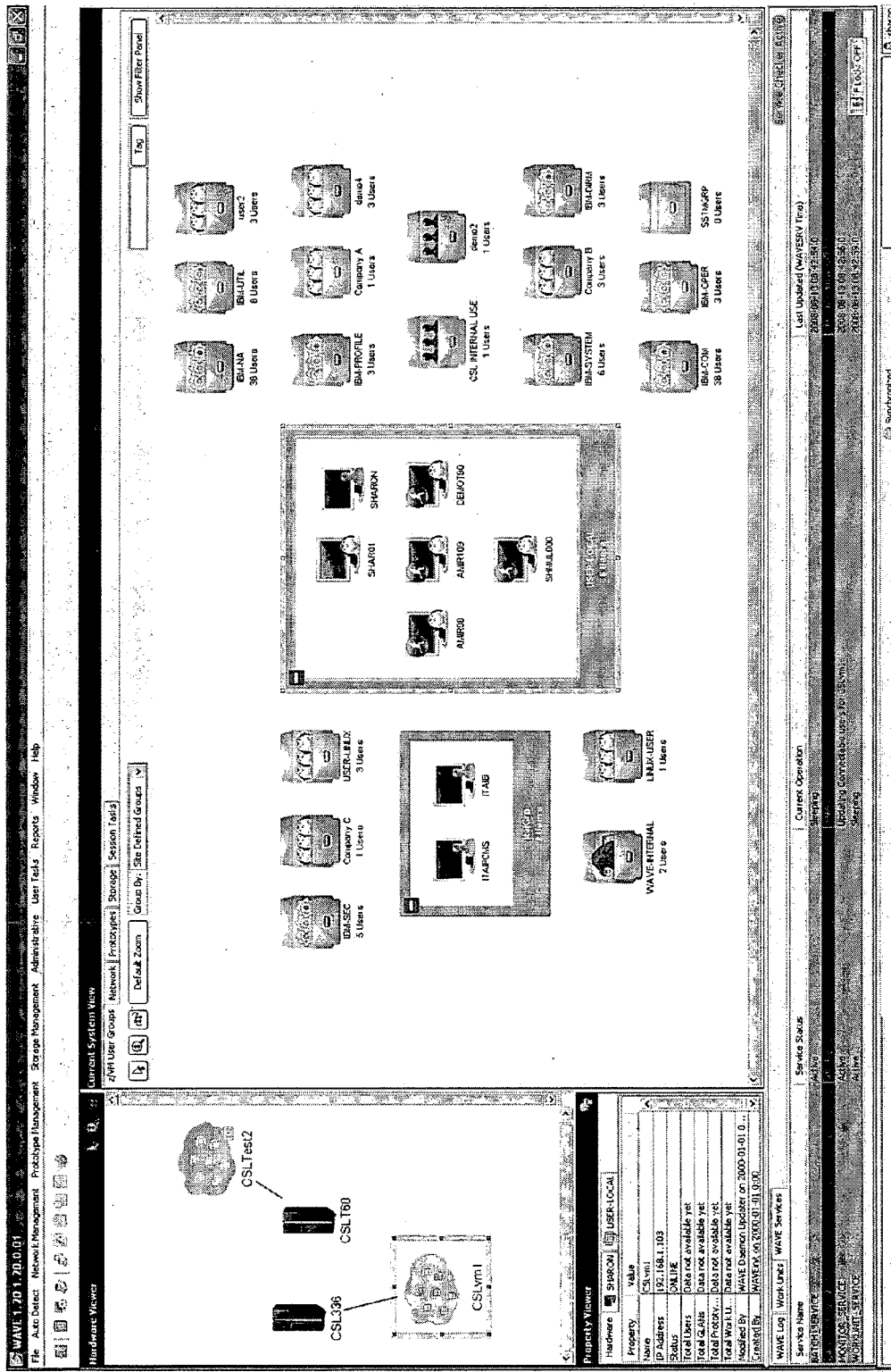

FIG. 4 shows a view on the exemplary GUI of a plurality of VM machines which are grouped according to metadata, such that the VM machines do not need to be connected through a Guest LAN or other type of connection. Instead, they are related according to one or more characteristics selected by the user. In addition, three VM machines are shown with highlighted boxes around them, indicating that they have been selected to form a subgroup.

Figure 5:
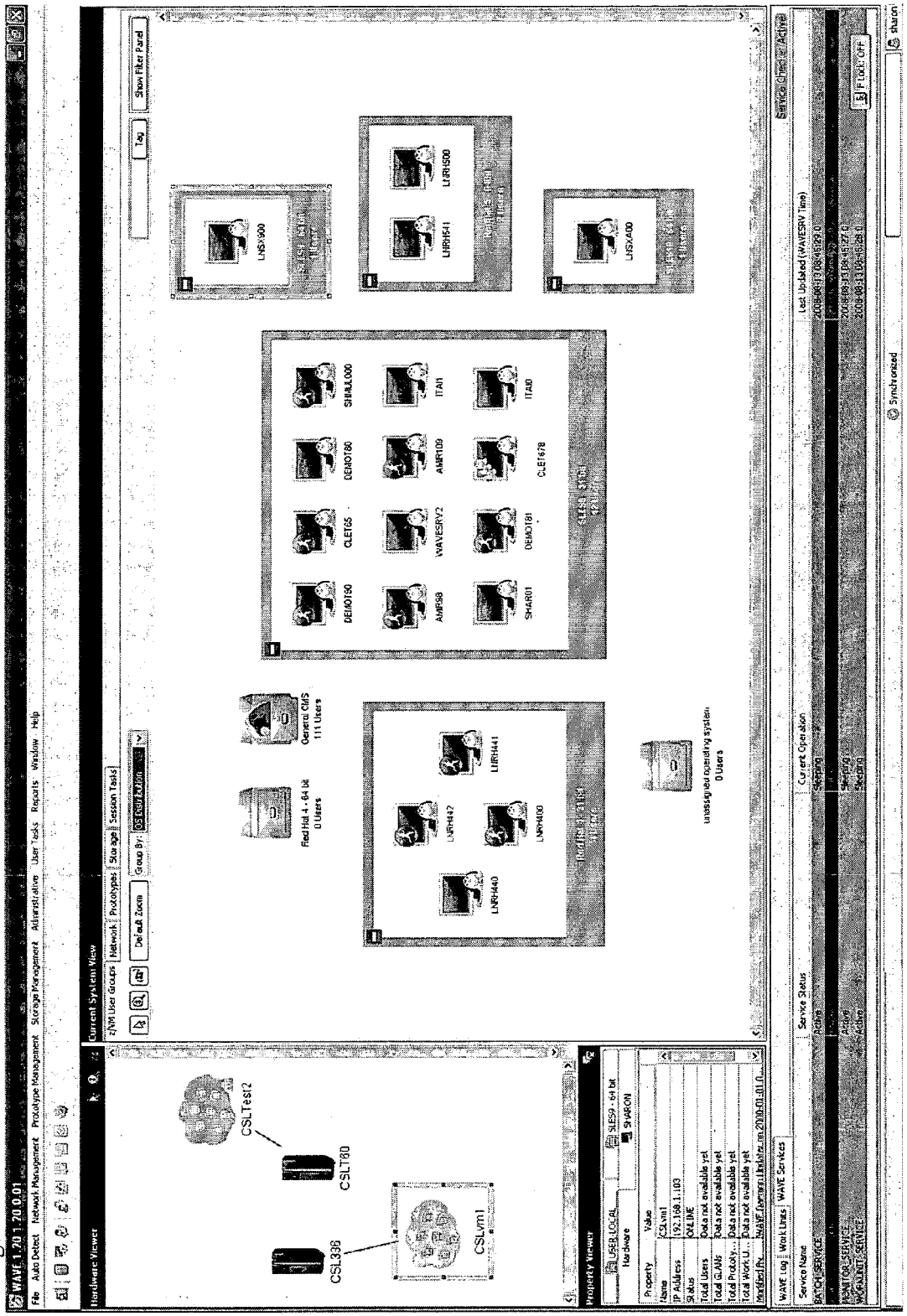

FIG. 5 shows a view on the exemplary GUI of a group, indicating the different icons (which in this example preferably include a symbol related to the type of operating system being run by the VM machine).

Figure 6:
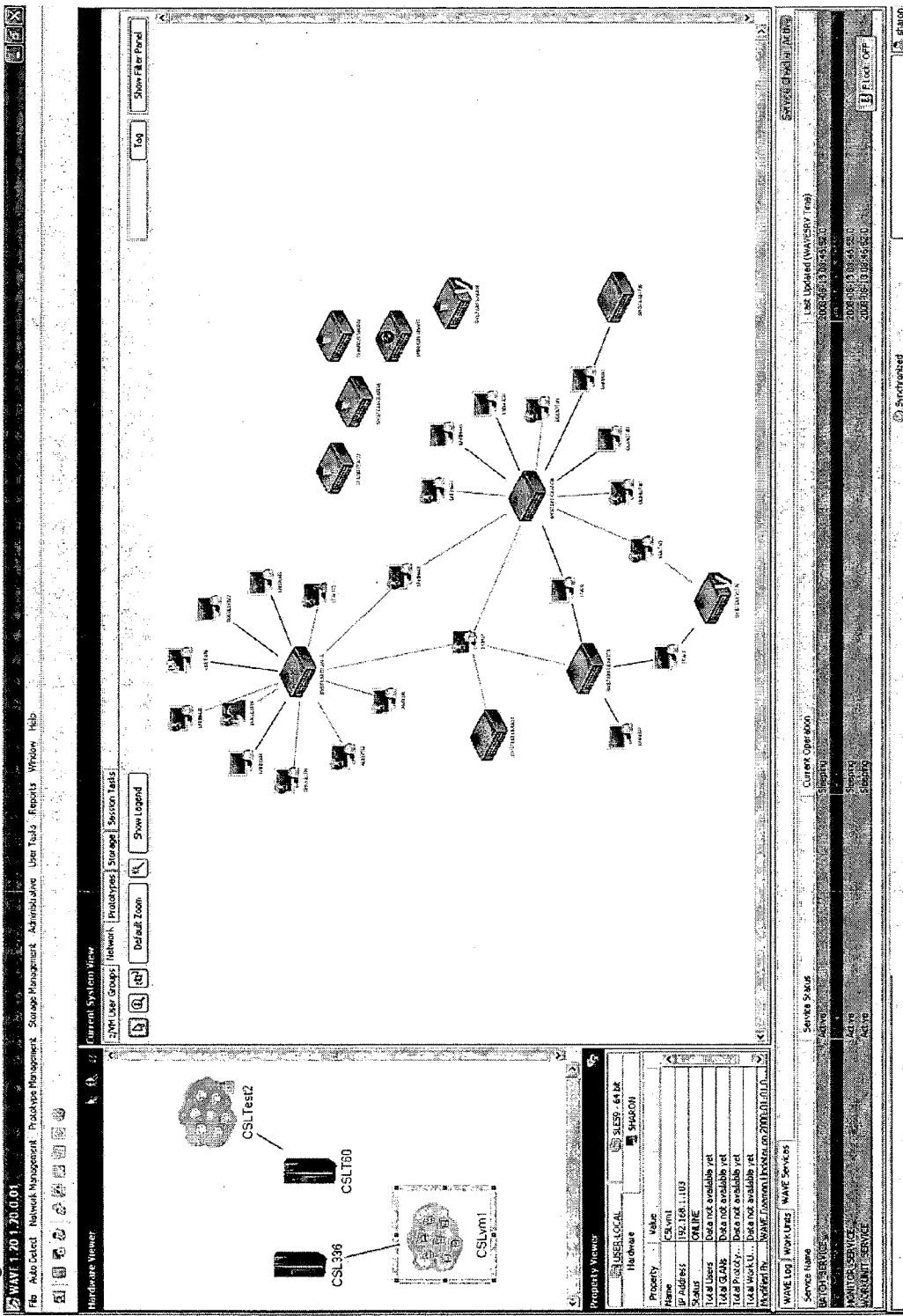

FIG. 6 shows a view on the exemplary GUI of a Guest LAN, which includes a plurality of VM machines connected through at least one virtual switch (of which a plurality is shown herein for the sake of illustration only). The user preferably may choose to make a new connection between a VM machine and a virtual switch by drawing a connecting line on the GUI, or alternatively may choose to delete such a connection by deleting the connecting line on the GUI. A small thumbnail insert is preferably provided which shows the overall Guest LAN (if there are a plurality of such Guest LANs, all of them would be shown, with their interconnections, on the thumbnail insert).

FIG. 7 shows a view on the exemplary GUI of a window box for creating a new Guest LAN. As shown, the user is requested to enter such information as the name of the new Guest LAN, whether it is to be temporary (ending at the end of a session), persistent (present between sessions but requiring re-entry of information) or permanent (present between sessions with all data stored). Also the user needs to enter the relevant NIC (network interface card) identifier (which may optionally be real or virtual), the IP segment and the default gateway for the Guest LAN. The net mask and broadcast address are preferably determined automatically but are shown to the user.

Figure 8:
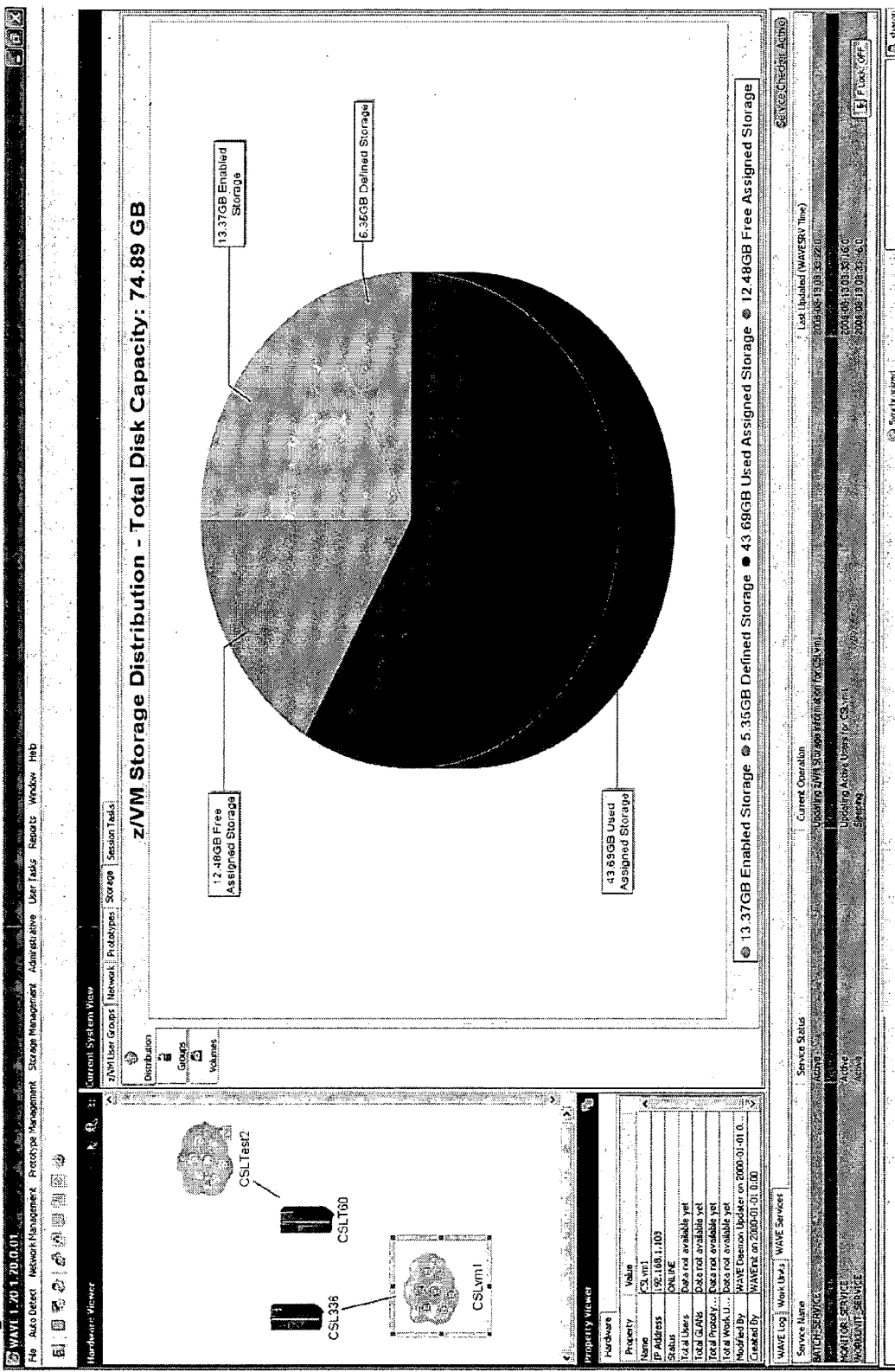

FIG. 8 shows a view on the exemplary GUI of a plurality of VM machines with regard to the hardware configuration.

Figure 9:
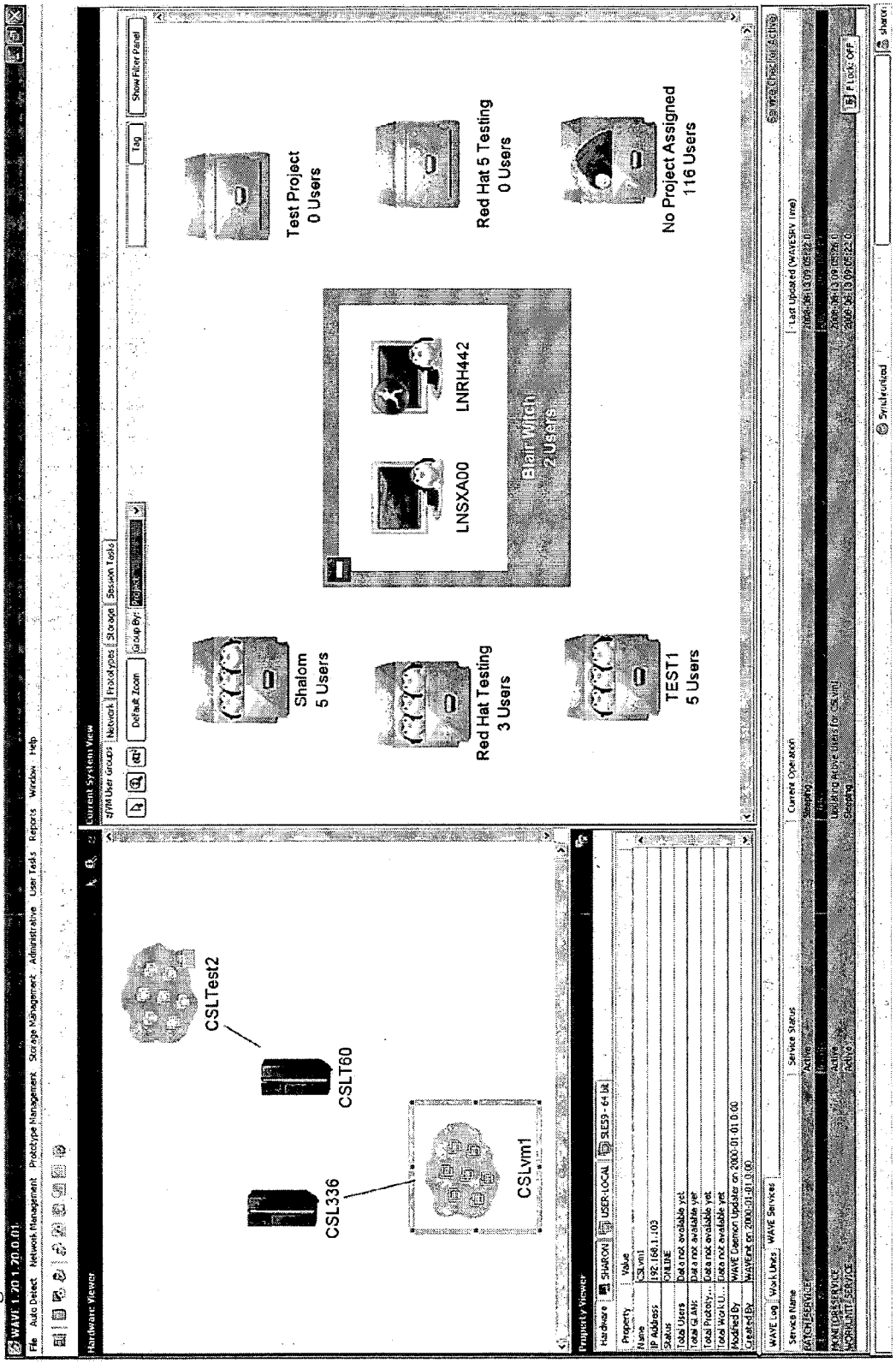
Figure 10:
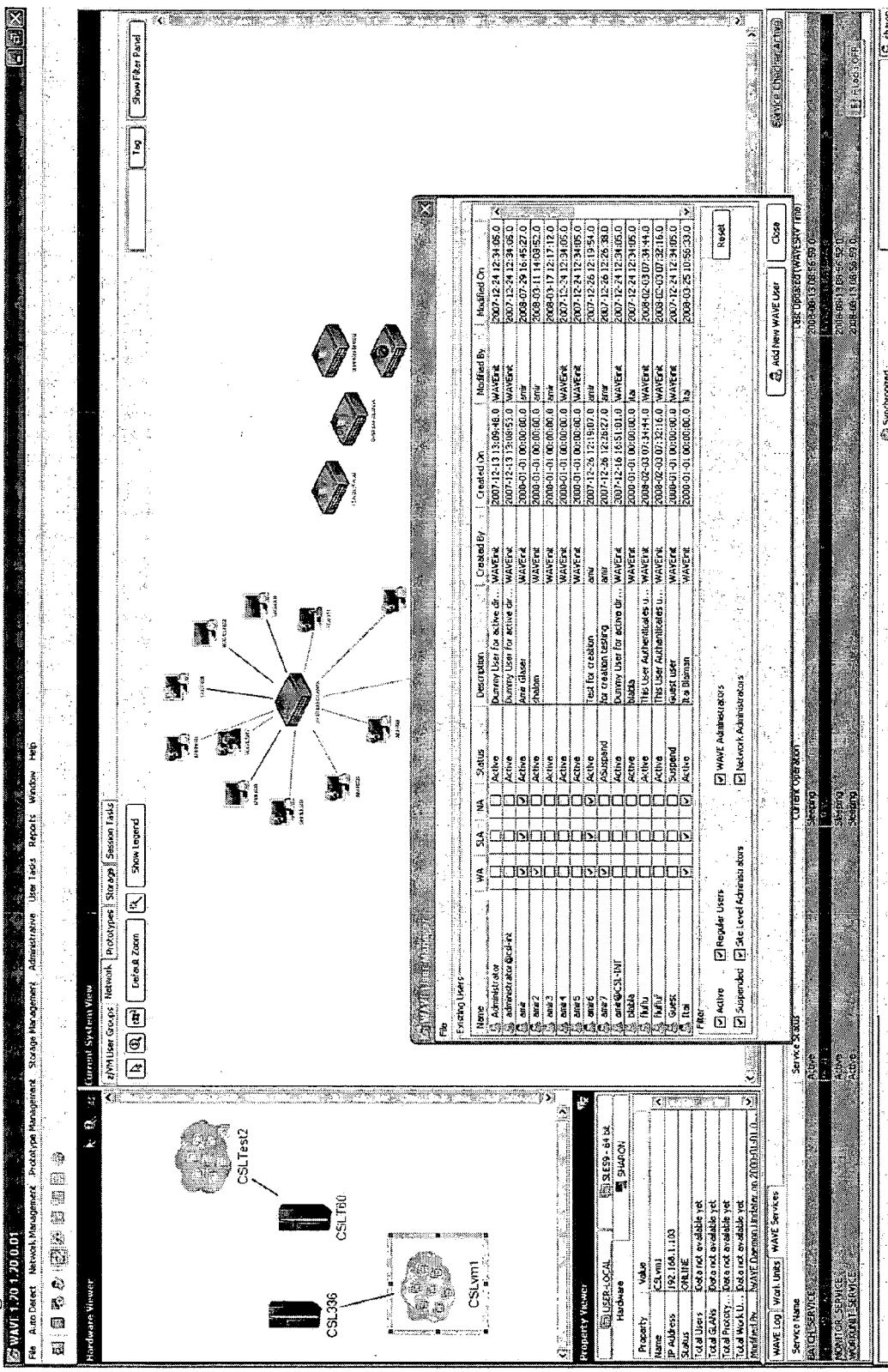
Figure 12:
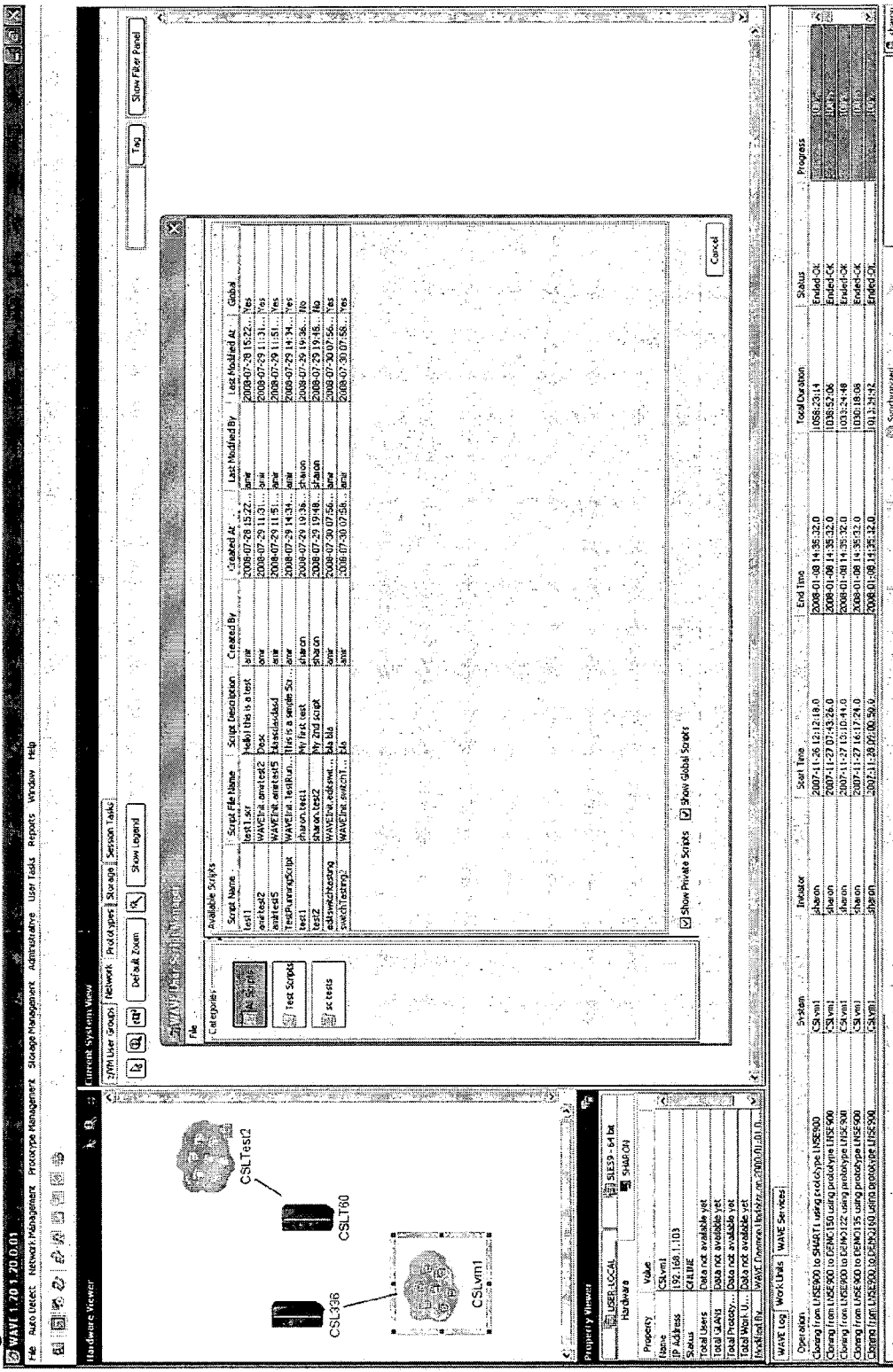
Figure 13:
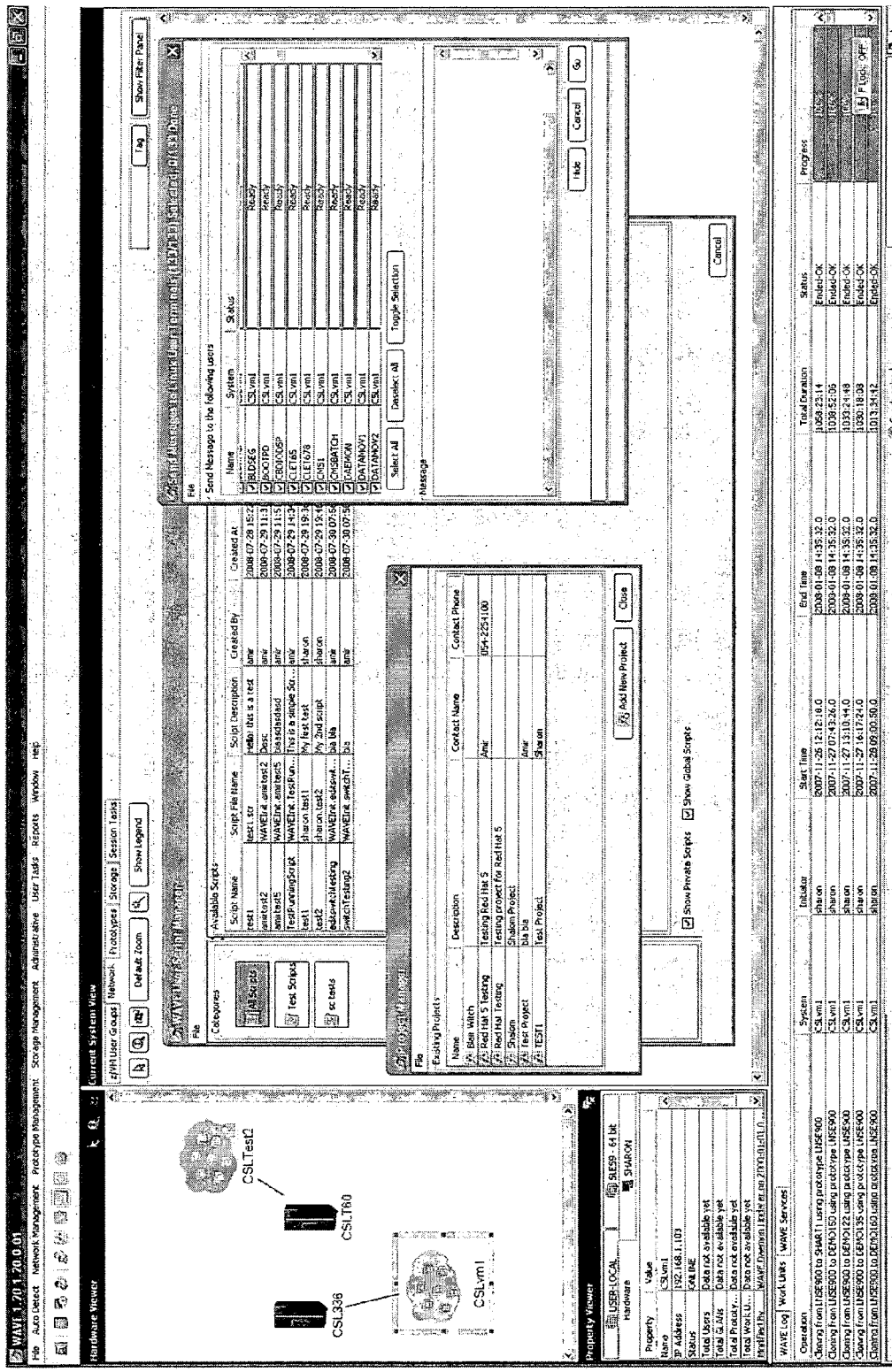

FIG. 9 shows a view on the exemplary GUI of a plurality of VM machines in a plurality of CPCs. A plurality of CPCs may optionally be created and also managed, according to some embodiments of the present invention. For creation, the user is prompted for a name for the CPC (which may optionally be any name selected by the user), its status (for example, active or inactive), and the model of the CPC and the CPC CPU ID (the latter two parameters may optionally be used for license generation or control). The user may then optionally add a new z/VM system and so forth, as previously described.

The present invention, in the embodiments shown relating to management of multiple CPCs, is not limited in the number of CPCs or z/VM systems that may be managed simultaneously.

FIGS. 10-13 show illustrative views of combined aspects of the exemplary GUI.

While the invention has been described with respect to a limited number of embodiments, it will be appreciated that many variations, modifications and other applications of the invention may be made.

The invention claimed is:

1. A computer-implemented method for abstracting a virtual machine environment, comprising a plurality of virtual machines connected through virtual connections to form a virtual machine network; the computer-implemented method comprising:

providing a GUI (graphical user interface);

providing, via a processor, a graphical representation of the virtual machine environment through said GUI, wherein each virtual machine is shown as a separate component and wherein virtual connections between said plurality of virtual machines are shown to form a network;

overlaying, via the processor, an abstraction over a hardware device, wherein an abstraction of the virtual machine environment is of both the hardware and software components of the virtual machine environment and wherein the plurality of virtual machines is operated by a single hardware device;

managing, via the processor, said virtual machines through said abstraction, wherein said managing comprises communicating with each virtual machine of the plurality of virtual machines as a separate device, and altering at least one aspect of said virtual machine network by manipulating said graphical representation of the virtual machine environment;

discovering, via the processor, a new virtual machine on the virtual machine network, using an auto-discovery mechanism employed by a Batch Service, without user input or intervention, wherein discovering comprises determining, automatically and without user input or intervention, an operating system of the new virtual machine; and adding, automatically and without user input or intervention, the new virtual machine to the virtual machine network, wherein adding comprises cloning one or more disks of a prototype machine; and aggregating a plurality of work units into a synchronous work unit.

2. The method of claim 1, wherein said virtual machine comprises a software construct selected from the group consisting of full virtualization and para-virtualization.

3. The method of claim 1, wherein said managing comprises one or more of activating or deactivating said virtual machine, showing a status, connecting or disconnecting from the virtual machine network, managing one or more attributes for the virtual machine, password management, and adding or removing one or more users of the virtual machine.

4. The method of claim 3, wherein said managing one or more attributes comprises managing one or more of a number of available virtual storage devices, determining how much storage is being used, managing one or more pages in virtual memory, managing storage type, and managing CPU use.

5. The method of claim 1, further comprising managing at least one user of said VM machine through said abstraction.

6. The method of claim 5, wherein said managing said at least one user further comprises determining at least one user permission or scope, or a combination thereof.

7. The method of claim 6, further comprising cloning an instance of the virtual machine according to a template or from another virtual machine.

8. The method of claim 1, wherein the virtual machine environment comprises an interface layer configured to communicate with one or more APIs (application programming interfaces) of a System z computing platform.

9. The method of claim 8, further comprising performing bare metal installation of a virtual machine environment by selecting an operating system to be installed on the virtual machine; and automatically installing said operating system on said virtual machine.

10. The method of claim 8, performed on a plurality of virtual machines.

11. The method of claim 10, wherein said plurality of virtual machines is selected by the user.

12. The method of claim 11, wherein execution of a process on said plurality of virtual machines is performed in the background.

13. The method of claim 12, wherein the user is notified upon a completion of said execution.

14. The method of claim 12, wherein the user selects to view progress of operation of said process.

15. The method of claim 1, wherein said altering at least one aspect of said virtual machine network by manipulating said graphical representation of the virtual machine environment comprises displaying said graphical representation to an administrator through said GUI, and altering at least one aspect of the virtual machines network by drawing on said GUI by said administrator.

16. A computer-implemented method for displaying a virtual machine environment that includes a plurality of virtual machines connected through virtual connections to form a virtual machine network, the method comprising:
providing a graphical user interface (GUI);
providing, via a processor, a graphical representation of the virtual machine environment for a user through the GUI, wherein each virtual machine is shown as a separate component and wherein virtual connections between the virtual machines are shown to form a virtual machine network;
presenting, via the processor, the virtual machine environment with a hardware device, wherein the presented virtual machine environment includes the hardware and software components of the virtual machine environment and wherein a plurality of virtual machines is operated by a single hardware device;
managing, via the processor, the virtual machines through the presented virtual machine environment, wherein the managing comprises communicating with each virtual machine as a separate device and altering an aspect of the virtual machine network by manipulating the graphical representation of the virtual machine environment; and
discovering, via the processor, a new virtual machine on the virtual machine network, using an auto-discovery mechanism employed by a Batch Service, without user input or intervention, wherein discovering comprises determining, automatically and without user input or intervention, an operating system of the new virtual machine; and
adding, via the processor, automatically and without user input or intervention, a new virtual machine to the virtual machine network, wherein adding comprises cloning one or more disks of a prototype machine; and
aggregating a plurality of work units into a synchronous work unit.

* * * * *